June 29, 1965 A. FISCHER 3,191,730
SEALING ARRANGEMENT FOR FASTENING MEANS
Filed May 10, 1961

INVENTOR.
BY ARTUR FISCHER

United States Patent Office 3,191,730
Patented June 29, 1965

3,191,730
SEALING ARRANGEMENT FOR
FASTENING MEANS
Artur Fischer, Tumlingen, Kreis Freudenstadt, Germany
Filed May 10, 1961, Ser. No. 109,111
Claims priority, application Germany, June 21, 1960,
F 31,471
7 Claims. (Cl. 189—88)

The present invention relates to a sealing arrangement for fastening means, and more particularly to a sealing arrangement for elongated fastening means adapted to fastening a corrugated sheet member, such as for instance a corrugated asbestos slate board to a wall or the like.

Such corrugated sheets are usually fastened to a wall or roof by elongated fastening means such as screws or the like, which extend with an end portion thereof through and beyond the crest portion of the corrugated member distant from the wall so that the head formed at the free end of the elongated fastening means engages the crest portion to fasten thereby the corrugated sheet to the wall. Due to temperature variations a small clearance forms between the screw head and the crest portion of the corrugated sheet engaged thereby and moisture will seep through this clearance into the space between the corrugated sheet and the wall.

It is known to provide sealing means between the screw head and the crest portion of the corrugated member, but, as the screw contracts and expands due to temperature variations a gap will form between this sealing means and the head portion of the screw or fastening member and moisture will seep through this gap into the forementioned space.

It is one object of the present invention to avoid the shortcomings of such sealing means known in the art.

It is a further object of the present invention to provide for sealing means which will stay in sealing contact with the head of the elongated fastening means and the element to be fastened thereby, regardless of temperature variations.

It is an additional object of the present invention to provide for such sealing means which are composed of few and simple parts which can be manufactured at low cost and which can be assembled in a very efficient manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partial, partially sectioned side view of the sealing arrangement according to the present invention, omitting, however, the elongated fastening means used for fastening the corrugated member to a wall or the like;

FIG. 3 is a side view similar to FIG. 1, drawn to a smaller scale and indicating also the elongated fastening means used to fasten the corrugated member to a wall or the like.

Figure 2:
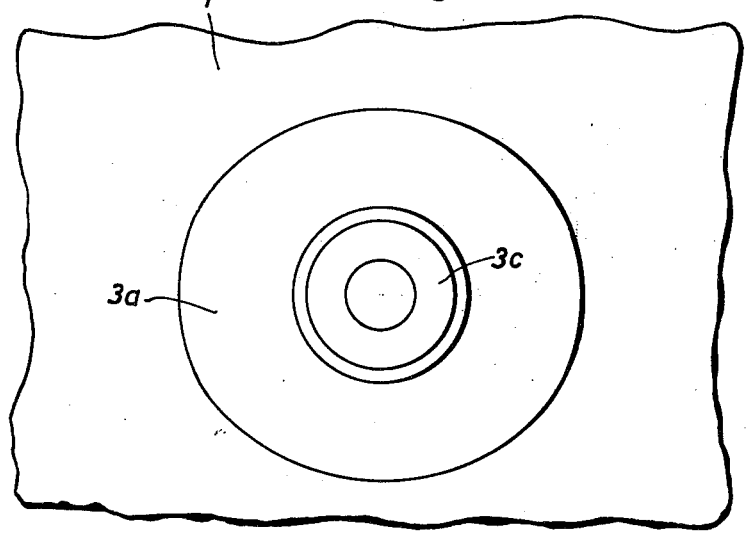
FIG. 2 is a top view of the arrangement shown in FIG. 1.
Figure 3:
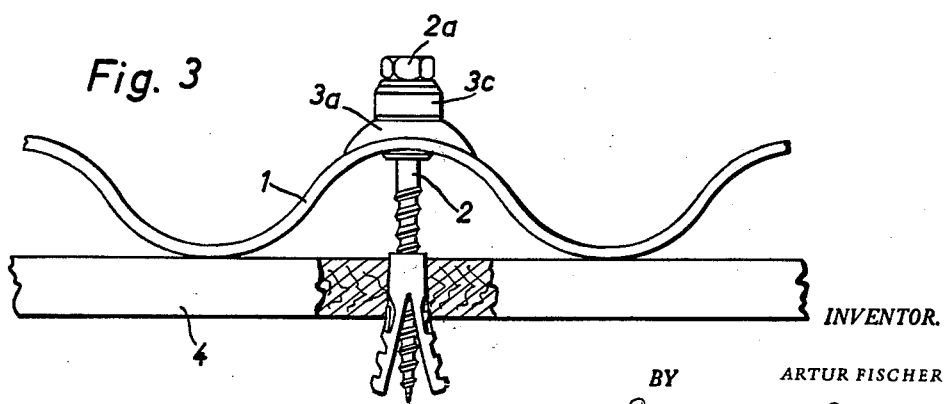

FIG. 3 of the drawing shows the sealing means according to the present invention used in combination with elongated fastening means adapted to fasten a corrugated member 1 such as for instance corrugated asbestos slate board to a wall 4 or the like. The elongated fastening means 2 are shown in the form of a wood screw engaging with the bottom end thereof, as viewed in FIG. 3, an expansion sleeve or expansion bolt located in an opening of the wall 4 and the bottom end of the wood screw 2 engages the expansion bolt for expanding the latter so that the expansion bolt and the wood screw are anchored in the wall 4. The specific construction of the expansion bolt does not form part of the present invention, and the expansion bolt may have for instance the specific construction as disclosed in my copending application Serial No. 684,814, now Patent No. 3,082,657. However, any other type of expansion bolt may be used in combination with the elongated fastening means or, if the wall member 4 is formed of wood or the like, the elongated fastening means 2 may simply comprise a wood screw directly screwed into the member 4. The elongated fastening means 2 has an end portion extending through and beyond the corrugated member 1 and is formed at the free end thereof with a head 2a. Located between the head 2a of the elongated fastening means 2 and the crest portion of the corrugated member 1 are the sealing means comprising two sealing members 3a and 3c, shown in further detail in FIGS. 1 and 2.

Figure 1:
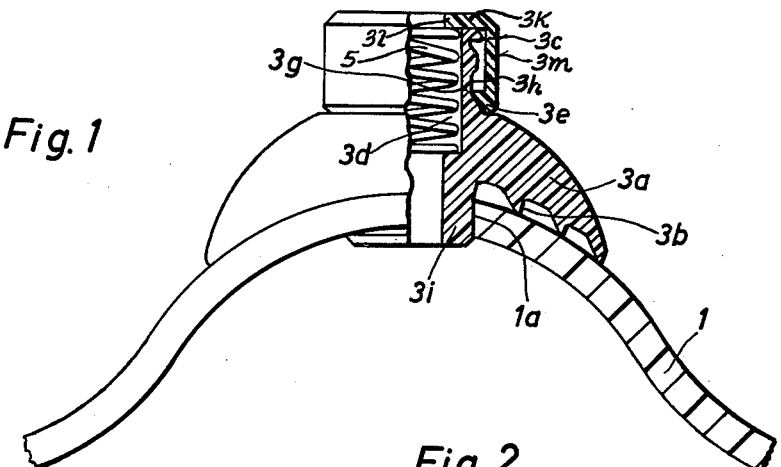

As can be best seen from FIG. 1 the sealing member 3a is substantially plate-shaped and formed at an end face thereof directed towards the crest portion of the corrugated member 1 with a plurality of annular sealing lips 3b directed toward and in engagement with the upper surface of this crest portion. A portion 3i of the plate-shaped member 3a extends through an opening 1a formed in the corrugated member 1 and the plate-shaped sealing member 3a is formed with a central projection 3g projecting in a direction opposite to the portion 3i from the body of the member 3a. The central projection 3g is formed at an outer annular surface portion thereof with an annular groove 3h. The member 3a is formed with a stepped central bore 3d therethrough, having a small diameter portion in the portion 3i and a large diameter portion in the projection 3g.

The sealing member 3c is cup-shaped and has an end wall portion 3k formed with an opening 3l therethrough, having an inner diameter smaller than the large diameter portion of the bore 3d, and an annular wall portion 3m formed at the free end thereof with a sealing lip 3e. The cup-shaped sealing member 3c is preferably formed from resilient material such as plastic and the sealing lip 3e has an inner diameter which is, when the sealing member 3c is not assembled with the sealing members 3a and when when this sealing member 3c is in unstressed condition, smaller than the diameter of the groove 3h formed in the central projection 3g of the plate-shaped sealing member 3a. When sealing members 3a and 3c are assembled as shown in FIG. 1, the sealing lip 3e will therefore resiliently engage in the groove 3h to provide a sealing contact between the sealing members 3e and 3c. The height of the sealing lip 3e is smaller than the width of the groove 3h so that the two sealing members can be moved in axial direction with respect to each other, while the sealing lip 3e will remain in sealing contact with the groove 3h formed on the projection of the plate-shaped sealing member 3a.

A coil spring 5 is located in the large diameter portion of the bore 3d of the plate-shaped sealing member 3a so as to engage with one end thereof the shoulder formed between the large and small diameter portion of the bore 3d and with the other ends thereof the end wall portion 3k of the cup-shaped sealing members 3c.

The sealing arrangement of the present invention is used in the following manner.

When a corrugated member 1 such as asbestos slate board or the like is to be fastened to a wall or roof, the corrugated member is placed against the outer surface of the wall or roof with openings 1a (FIG. 1) formed in the crest portions of the corrugated member 1 aligned with the openings formed in the wall 4. A plate-shaped sealing member 3a is then placed at each opening 1a with the projection 3i thereof extending in the respective opening 1a and with the sealing lips 3b engaging the crest portion of the corrugated member 1. A coil spring 5 is then dropped into the large diameter portion of the bore through each of the sealing members 3a. A cup-shaped sealing member 3c is then pushed with the open end thereof over the projection 3g of the plate-shaped sealing member 3a until the sealing lip 3e engages into the groove 3h formed on the outer periphery of the projection 3g. Finally, a screw 2 is pushed through opening 31 in the cup-shaped sealing member 3c and through the bore 3d aligned therewith and screwed into the expansion bolt located in the opening of the member 4 until the head 2a of the screw 2 engages the end wall portion 3k of the cup-shaped sealing member 3c. The corrugated sheet 1 is thus fastened to the member 4 with sealing means 3a, 3c located between the crest portions of the corrugated member 1 and the heads 2a of the screws 2. The spring 5 will maintain the end wall portion 3k of the cup-shaped sealing member 3c in engagement with the bottom surface of the screw head 2a and the sealing lips 3b of the plate-shaped sealing member 3a in engagement with the outer surface of the crest portion of the corrugated member 1 during expansion and contraction of the screw 2 and/or the corrugated member 1. During such expansion or contraction the sealing members 3a and 3c will move in axial direction with respect to each other while the sealing lip 3e will remain in sealing contact with the peripheral outer surface of the projection 3g formed on the plate-shaped sealing member 3a. Seepage of moisture through the sealing arrangement will thereby be positively prevented and the spring 5, which presses the sealing member 3a and 3c in sealing contact with the screw head 2a and the corrugated member 1, respectively, is also protected from contact with moisture.

The plate-shaped sealing member 3a is also preferably formed from slightly resilient synthetic plastic material. Instead of the coil spring 5 a plurality of spring washers or a resilient plug formed from rubber or the like and formed with a central opening through which the end portion of the screw 2 may extend, may also be used.

It will be understood that each of the elements described above, or two or more together, may also find a useful application in other types of sealing arrangements for fastening means differing from the types described above.

While the invention has been illustrated and described as embodied in a sealing arrangement for fastening means adapted to fasten a corrugated member to a wall or the like, it is not intended to be limited to the details shown, since various modifications and structural changes may be made without departing in any way from the spirit of the present invention.

I claim:

1. Sealed fastening arrangement for fastening an element to a wall or the like comprising, in combination, elongated fastening means having an end portion extending through and beyond the element and having at the free end thereof a head; sealing means comprising a pair of sealing members each having an opening therethrough, one of said sealing members having an outer annular surface portion and the other of said sealing members having an annular resilient portion surrounding said outer annular surface portion and being in resilient sealing contact therewith, said members being located between said head and the element with said end portion of said elongated fastening means extending through said openings and said members being movable with respect to each other in longitudinal direction of said elongated fastening means while said one member remains in sealing contact with said other member; and resilient means engaging said members and tending to move the same in opposiite direction away from each other so as to press one of said sealing members in sealing contact with said head and the other of said members in sealing contact with the element.

2. Sealed fastening arrangement for fastening an element to a wall or the like comprising, in combination, elongated fastening means having an end portion extending through and beyond the element and having at the free end thereof a head; sealing means comprising a pair of sealing members each having with an opening therethrough and said end portion of said elongated fastening means extending through said openings, one of said sealing members having an outer annular surface portion and the other of said sealing members having an annular resilient portion surrounding said outer annular surface portion and being in resilient sealing contact therewith, said members being located between said head and the element with one of said members engaging said head and the other of said members engaging said element, said one member having at least one annular sealing lip directed toward said element and said members being movable with respect to each other in longitudinal direction of said elongated fastening means while said one member remains in sealing contact with said other member; and resilient means engaging said members and tending to move the same in opposite direction away from each other so as to press said sealing lip of said one sealing member in sealing contact with the element and said other of said members in sealing contact with said head.

3. Sealed fastening arrangement for fastening an element to a wall or the like comprising, in combination, elongated fastening means having an end portion extending through and beyond the element and having at the free end thereof a head; sealing means located between said head and the element and comprising a first substantially plate-shaped sealing member having at least at the outer periphery thereof an annular sealing lip directed toward said element and having a central projection directed toward said head and having an opening extending longitudinally through said projection, and a second sealing member formed from resilient material and surrounding said projection and having an inwardly directed sealing lip in sealing engagement with an outer peripheral surface portion of said central projection, said second sealing member having an opening substantially aligned with said opening through said projection and said end portion of said elongated fastening means extending through said openings; and spring means engaging said sealing members and tending to move said members in opposite direction away from each other so as to press the sealing lip of said plate-shaped sealing member in engagement with the element and said other sealing member in engagement with said head.

4. Sealed fastening arrangement for fastening an element to a wall or the like comprising, in combination, elongated fastening means having an end portion extending through and beyond the element and having at the free end thereof a head; sealing means located between said head and the element and comprisnig a first substantially plate-shaped sealing member having at least at the outer periphery thereof an annular sealing lip directed toward said element and having a central projection directed toward said head and having an opening extending longitudinally through said projection, and on the outer surface thereof an annular groove of a given width and diameter, and a second sealing member formed from resilient material and surrounding said projection and having an inwardly directed sealing lip located in said groove, said inwardly directed sealing lip having a smaller height than the width of said groove and an inner diameter which is in unstressed condition of said other sealing member smaller than said diameter of said groove so that said sealing lip on said second sealing member resiliently engages in said groove to provide sealing contact between said sealing members while permitting the same to move in axial direction, said second sealing member having an opening substantially aligned with said opening through said projection and said end portion of said elongated fastening means extending through said openings; and spring means engaging said sealing members and tending to move said members in opposite direction away from each other so as to press the sealing lip of said plate-shaped sealing member in engagement with the element and said second sealing member in engagement with said head.

5. Sealed fastening arrangement for fastening an element to a wall or the like comprising, in combination, elongated fastening means having an end portion extending through and beyond the element and having at the free end thereof a head; sealing means located between said head and the element and comprising a plate-shaped sealing member located adjacent said element and having a central projection directed toward said head, said member having a stepped central bore therethrough having a small diameter portion adjacent said element and a large diameter portion distant therefrom and having at least on the periphery thereof a sealing lip directed toward said element, and a cup-shaped sealing member formed from resilient plastic material having an end wall portion having an opening therethrough aligned with said bore and having a diameter smaller than said large diameter portion of said bore and having an annular wall portion surrounding said projection and having at the free end thereof an inwardly directed sealing lip resiliently engaging an annular outer surface portion of said projection, said end portion of said elongated fastening means extending through said bore and said opening; and a coil spring located in said large diameter portion of said bore and engaging with one end thereof said plate-shaped sealing member at a shoulder formed between said small and large diameter portions of said bore and with the other end thereof said end wall portion of said cup-shaped sealing member so as to press said cup-shaped sealing member in sealing engagement with said head and the sealing lip of said plate-shaped sealing member in sealing engagement with said element.

6. Sealed fastening arrangement for fastening a corrugated asbestos slate board or the like to a wall comprising, in combination, elongated fastening means having an end portion extending through and beyond a crest portion of said corrugated board distant from the wall and having at the free end thereof with a head; sealing means located between said head and said crest portion and comprising a substantially plate-shaped sealing member having a curved end face directed toward said crest portion and having at said end face a plurality of annular sealing lips directed toward and engaging said crest portion and having a central projection directed toward said head, said plate-shaped sealing member having a stepped central bore therethrough having a small diameter portion adjacent said crest portion and a large diameter portion distant therefrom and said central projection having at the outer periphery thereof an annular groove of a given width and diameter, said sealing means comprising further a cup-shaped sealing member formed from resilient plastic material having an end wall portion having an opening therethrough aligned with said bore and having a diameter smaller than said large diameter portion of said bore, said cup-shaped sealing member having an annular wall portion surrounding said central projection and having at the free end thereof an inwardly directed sealing lip of a height smaller than the width of said groove and of an inner diameter which is in unstressed condition of said cup-shaped sealing member smaller than said diameter of said groove so that said sealing lip of said cup-shaped sealing member resiliently engages in said groove to provide sealing contact between said sealing members while permitting the same to move in axial direction, said end portion of said screw extending through said bore and said opening; and a coil spring located in said large diameter portion of said bore about said end portion of said screw and engaging with one end thereof said plate-shaped sealing member at a shoulder between said small and large diameter portions of said bore and with the other end thereof said end wall portion of said cup-shaped sealing member so as to press said cup-shaped sealing member in sealing engagement with said head and the sealing lip of said plate-shaped sealing member in sealing engagement with said element.

7. Sealed fastening arrangement for fastening an element to a wall or the like comprising, in combination, elongated fastening means having an end portion extending through and beyond the element and having at the free end thereof a head; sealing means comprising a pair of sealing members each having an opening therethrough and said end portion of said elongated fastening means extending through said openings, one of said sealing members having an outer annular surface portion and the other of said sealing members having an annular resilient portion surrounding said outer annular surface portion and being in resilient sealing contact therewith, said members being located between said head and the element with one of said members engaging said head and the other of said members engaging said element, said one member having at least one annular sealing lip directed toward said element and said members being movable with respect to each other in longitudinal direction of said elongated fastening means while said one member remains in sealing contact with said other member; and resilient means engaging said members and tending to move the same in opposite direction away from each other so as to press said sealing lip of said one sealing member in sealing contact with the element and said other of said members in sealing contact with said head, both of said sealing members being made of resilient plastic material.

References Cited by the Examiner

UNITED STATES PATENTS

| | | | |
|---|---|---|---|
| 850,487 | 4/07 | Plass | 50—203 |
| 1,168,942 | 1/16 | Irwin | 50—203 |
| 1,638,671 | 8/27 | Wagner | 189—35 |
| 1,711,415 | 4/29 | Lane | 189—35 |
| 2,417,262 | 3/47 | Morehouse | 189—36 X |
| 2,560,092 | 7/51 | De Lamater | 16—2 |
| 2,851,079 | 9/58 | Heller | 151—38 |

FOREIGN PATENTS

| | | |
|---|---|---|
| 377,431 | 6/23 | Germany. |
| 67,676 | 4/44 | Norway. |

OTHER REFERENCES

German printed publication 1,011,138, June 27, 1957; inventor: Hans Twerenbold.

HENRY C. SUTHERLAND, *Primary Examiner.*

JACOB L. NACKENOFF, *Examiner.*